United States Patent [19]
Benson, Jr. et al.

[11] Patent Number: 5,477,209
[45] Date of Patent: Dec. 19, 1995

[54] REMOTE CONTROLLED SAFETY LIGHT HAVING INCREASED NOISE DISCRIMINATION

[75] Inventors: Raymond G. Benson, Jr., Plainfield; John J. Robinson, Indianapolis, both of Ind.

[73] Assignee: Adonis Incorporated, Kokomo, Ind.

[21] Appl. No.: 270,029

[22] Filed: Jul. 1, 1994

Related U.S. Application Data

[63] Continuation-in-part of Ser. No. 169,973, Dec. 20, 1993, Pat. No. 5,353,008, which is a continuation of Ser. No. 877,296, May 1, 1992, abandoned.

[51] Int. Cl.$^6$ .................................................. B60Q 1/44
[52] U.S. Cl. ................... 340/479; 340/432; 340/825.69; 340/825.04
[58] Field of Search ...................... 340/825.69, 825.04, 340/467, 479, 432, 310.01; 200/61.89, 86.5; 307/108; 180/271; 123/359, 198 D; 455/33.1, 33.2

[56] References Cited

U.S. PATENT DOCUMENTS

| | | | |
|---|---|---|---|
| 4,162,486 | 7/1979 | Wyler | 340/310.02 |
| 4,367,557 | 1/1983 | Stern et al. | 340/310.01 |
| 4,559,586 | 12/1985 | Slarve | 340/479 |
| 4,760,373 | 7/1988 | Reilly | 340/479 |
| 4,769,629 | 9/1988 | Tigwell | 340/467 |
| 4,890,108 | 12/1989 | Drori et al. | 340/539 |
| 4,891,736 | 1/1990 | Gouda | 362/105 |
| 4,956,752 | 9/1990 | Foglietti | 340/432 |
| 5,040,099 | 8/1991 | Harris | 362/105 |
| 5,142,278 | 8/1992 | Moallemi et al. | 340/310.01 |
| 5,172,095 | 12/1992 | Scott | 340/479 |
| 5,239,557 | 8/1993 | Dent | 455/33.1 |
| 5,353,008 | 10/1994 | Eikenberry et al. | 340/479 |

*Primary Examiner*—Brent A. Swarthout
*Assistant Examiner*—Nina Tong
*Attorney, Agent, or Firm*—Foley & Lardner

[57] ABSTRACT

A motorcycle helmet, snowmobile helmet, or other apparel worn by riding a vehicle is coupled with a brake light assembly. The brake light assembly includes a receiver circuit for receiving an encoded radio frequency (RF) signal from a transmitter located on the vehicle. The receiver circuit turns on the brake light for a predetermined amount of time after the brake signal is received. The transmitter is turned off for a second predetermined amount of time after the encoded signal is transmitted. The second predetermined amount of time is less than the first predetermined amount of time. The second predetermined amount of time is advantageously a pseudo random of time. The radio-controlled brake light system advantageously increases noise immunity and spurious illumination of the brake light in response to signals from other riders or operators.

20 Claims, 17 Drawing Sheets

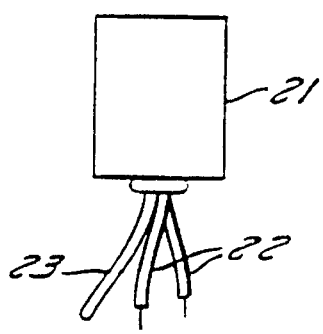
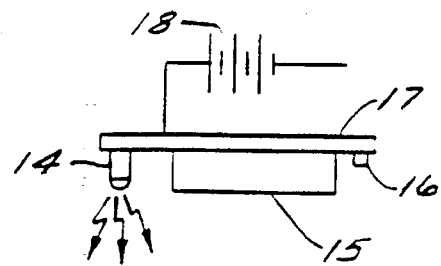
FIG. 3
FIG. 4
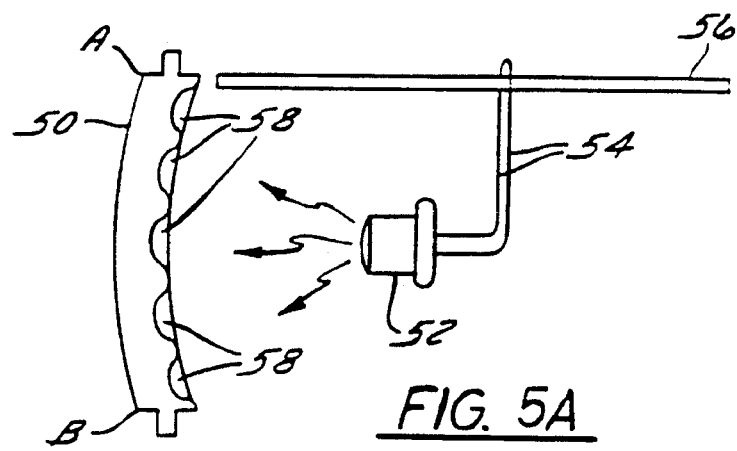
FIG. 5A
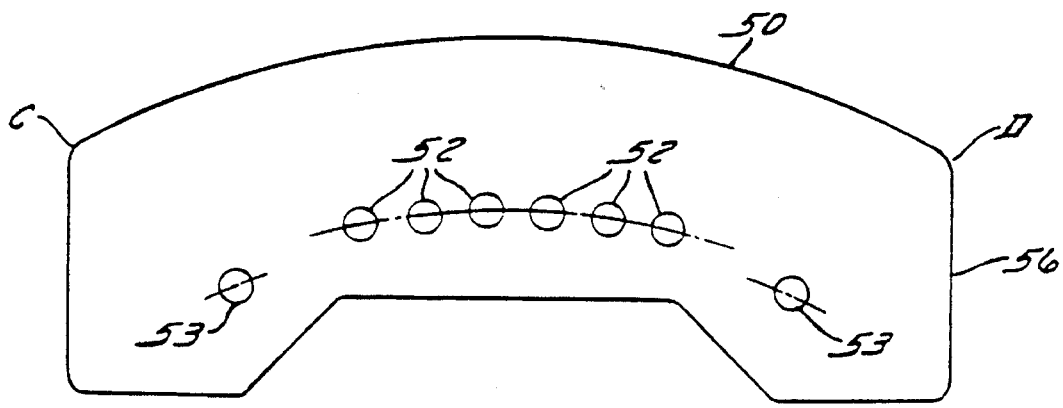
FIG. 5B

```
131PG01J - COPYRIGHT, MARCH 1994 SPAN, INC. & ADONIS, INC.    Page 1
AUTHOR: JOHN J. ROBINSON
;       HELMET RECEIVER SOFTWARE - PROCESSOR RUNS AT 4 MHZ
;       RECEIVES EIGHT BITS FORMATTED AS IN FOLLOWING SAMPLE
;
;       START   BIT 7           BIT 6           BIT 0
;      _____          _____          _____         _____  _____
;            |_____|0     |_____|1     |_____|      |      |_____|
;
; uS|  600   | 300 | 300 |   600   | 300 |

OFFCYC  EQU     .12
TMO     EQU     080

LIST    P=16C54
        NLIST   W

IDR     EQU     00
RTCC    EQU     01
PC      EQU     02
SWR     EQU     03
FSR     EQU     04
PRTA    EQU     05
PRTB    EQU     06
PRTC    EQU     07

SD      EQU     000
SOD     EQU     001
TST     EQU     002
LED     EQU     003
LDON    EQU     000

BITCNT  EQU     008
TRKVLU  EQU     009
DTATRK  EQU     00A
DTAL    EQU     00B
CNT     EQU     00C
FLAG    EQU     00D
RTCNT   EQU     00E

BTFBC   MACRO   ?F,?B,?J
        BTFSS   ?F,?B
        GOTO    ?J
        ENDM

BTFBS   MACRO   ?F,?B,?J
        BTFSC   ?F,?B
        GOTO    ?J
        ENDM

ORG     000

DTAIN   MOVLW   001             ;24 INCLUDES CALL
        TRIS    PRTB
UDRTC   BTFSC   RTCC,7
        INCF    RTCNT
        BTFSC   RTCC,7
        BCF     RTCC,7
```

FIGURE 12A

231PG01J - COPYRIGHT, MARCH 1994 SPAN, INC. & ADONIS, INC.   Page 2
AUTHOR: JOHN J. ROBINSON

```
         RRF     PRTB,W
         RRF     DTATRK
         SKPNC
         DECF    TRKVLU
         BTFSC   DTATRK,7
         INCF    TRKVLU
         MOVLW   003
         SUBWF   TRKVLU,W
         SKPC    CHKONE
         BSF     PRTB,SOD
         MOVLW   006
         SUBWF   TRKVLU,W
         SKPNC
         BCF     PRTB,SOD
         RETLW   0

INIT     MOVLW   007
         OPTION
         MOVLW   00F
         TRIS    PRTA
         MOVLW   008
         MOVWF   TRKVLU
         MOVLW   0FF
         MOVWF   DTATRK

FRCLED   BCF     PRTB,LED
         BCF     FLAG,LDON
         CLRF    RTCC
         CLRF    RTCNT
LOOP     MOVLW   007
         OPTION

WTSTP    MOVLW   .28             ;32US * 28 = 896
         MOVWF   CNT
STPLP    CALL    DTAIN           ;24
         CLRWDT
         BTFBS   RTCNT,4,FRCLED  ;1.024 SEC TMO
         BTFBC   PRTB,SOD,WTSTP
         DECFSZ  CNT
         GOTO    STPLP

WTSTRT   MOVLW   .15             ;32US * 15=480US
         MOVWF   CNT
STRTLP   CALL    DTAIN           ;24
         CLRWDT
         BTFBS   RTCNT,4,FRCLED  ;1.024 SEC TMO
         BTFBS   PRTB,SOD,WTSTRT
         DECFSZ  CNT
         GOTO    STRTLP

MOVLW   008
         MOVWF   BITCNT
         MOVLW   .13             ;32US * 13 = 416US
RBITLP   MOVWF   CNT
BITLP    CALL    DTAIN           ;24
         CLRWDT
```

FIGURE 12B

231PG01J - COPYRIGHT, MARCH 1994 SPAN, INC. & ADONIS, INC.    Page 3
AUTHOR: JOHN J. ROBINSON

```
            BTFBS   RTCNT,4,FRCLED   ;1.024 SEC TMO
            BTFBS   PRTB,SOD,HEDGE
            DECFSZ  CNT
            GOTO    BITLP
            GOTO    LOOP

HEDGE       MOVLW   .24              ;32US * 24 = 768US
            MOVWF   CNT
HLP         CALL    DTAIN            ;24
            CLRWDT
            BTFBS   RTCNT,4,FRCLED   ;1.024 SEC TMO
            BTFBC   PRTB,SOD,LEDGE
            DECFSZ  CNT
            GOTO    HLP
            GOTO    LOOP

LEDGE       MOVLW   .10              ;32US * (24-10) = 448US AND UP = 1
            SUBWF   CNT,W
            RLF     DTAL             ;SHIFT IN BIT
            MOVLW   .15              ;32US * 15 = 480US
            DECFSZ  BITCNT           ;8 OF THEM
            GOTO    RBITLP

MOVLW   00F
            TRIS    PRTA
            ANDWF   PRTA,W
            MOVWF   BITCNT
            BTFSC   BITCNT,0
            BSF     BITCNT,4
            BTFSC   BITCNT,1
            BSF     BITCNT,5
            BTFSC   BITCNT,2
            BSF     BITCNT,7
            BTFSC   BITCNT,3
            BSF     BITCNT,6
            SWAPF   BITCNT
            MOVLW   00F
            ANDWF   BITCNT,W
            IORLW   0A0
            XORLW   0FF
            XORWF   DTAL,W
            BNZ     LOOP

LEDON       MOVLW   001
            TRIS    PRTB
;           BTFSC   FLAG,LDON
            BSF     PRTB,LED
            BSF     FLAG,LDON
            CLRF    RTCC
            CLRF    RTCNT
            GOTO    LOOP

ORG     1FF
            GOTO    INIT

END
```

FIGURE 12C

231PG02J - COPYRIGHT, MARCH 1994 SPAN, INC. & ADONIS, INC.    Page 1
AUTHOR: JOHN J. ROBINSON

```
;       HELMET TRANSMITTER SOFTWARE - PROCESSOR RUNS AT 4 MHZ
;       TRANSMITS EIGHT BITS FORMATTED AS IN FOLLOWING SAMPLE
;
;       START   BIT 7           BIT 6                   BIT 0
;       ___             ___             ___     __      ___     _
;       |  |_____| 0 |___|       | 1 |___|  |__|    |___|____|
;
; uS |  600     | 300 | 300 |  600    | 300 |

LIST    P=16C54
        NLIST   W

IDR     EQU     00
RTCC    EQU     01
PC      EQU     02
SWR     EQU     03
FSR     EQU     04
PRTA    EQU     05
PRTB    EQU     06
PRTC    EQU     07

DLY     EQU     008
CNT     EQU     009
TMP1    EQU     00A
DLYCNT  EQU     00B

STRTSP  EQU     .4
ONET    EQU     .4
ONESPC  EQU     .2
ZROT    EQU     .2
ZROSPC  EQU     .2

ORG     000

TMOPRD  MOVF    PRTA,W
        ANDLW   00F
        MOVWF   TMP1
        CLRC
        RLF     TMP1
        RLF     TMP1
        RLF     TMP1
        INCF    DLYCNT
        MOVLW   007
        ANDWF   DLYCNT,W
        ADDWF   TMP1,W
        ADDWF   PC

RETLW   .80
        RETLW   .70
        RETLW   .59
        RETLW   .86
        RETLW   .78
        RETLW   .60
        RETLW   .100
        RETLW   .65
```

FIGURE 13A

331PG02J - COPYRIGHT, MARCH 1994 SPAN, INC. & ADONIS, INC.   Page 2
AUTHOR: JOHN J. ROBINSON

```
        RETLW   .70
        RETLW   .59
        RETLW   .71
        RETLW   .95
        RETLW   .89
        RETLW   .99
        RETLW   .63
        RETLW   .74

RETLW   .64
        RETLW   .75
        RETLW   .73
        RETLW   .67
        RETLW   .94
        RETLW   .90
        RETLW   .97
        RETLW   .109

RETLW   .59
        RETLW   .79
        RETLW   .96
        RETLW   .69
        RETLW   .90
        RETLW   .103
        RETLW   .61
        RETLW   .101

RETLW   .74
        RETLW   .59
        RETLW   .64
        RETLW   .66
        RETLW   .67
        RETLW   .69
        RETLW   .107
        RETLW   .75

RETLW   .61
        RETLW   .90
        RETLW   .103
        RETLW   .86
        RETLW   .70
        RETLW   .71
        RETLW   .93
        RETLW   .81

RETLW   .97
        RETLW   .81
        RETLW   .63
        RETLW   .79
        RETLW   .92
        RETLW   .59
        RETLW   .89
        RETLW   .95
```

FIGURE 13B

231PG02J - COPYRIGHT, MARCH 1994 SPAN, INC. & ADONIS, INC.    Page 3
AUTHOR: JOHN J. ROBINSON

```
         RETLW    .109
         RETLW    .100
         RETLW    .73
         RETLW    .81
         RETLW    .79
         RETLW    .59
         RETLW    .63
         RETLW    .98

RETLW    .78
         RETLW    .109
         RETLW    .59
         RETLW    .63
         RETLW    .90
         RETLW    .77
         RETLW    .79
         RETLW    .95

RETLW    .70
         RETLW    .75
         RETLW    .59
         RETLW    .107
         RETLW    .67
         RETLW    .71
         RETLW    .63
         RETLW    .100

RETLW    .97
         RETLW    .101
         RETLW    .73
         RETLW    .59
         RETLW    .81
         RETLW    .87
         RETLW    .65
         RETLW    .97

RETLW    .99
         RETLW    .61
         RETLW    .91
         RETLW    .59
         RETLW    .69
         RETLW    .64
         RETLW    .103
         RETLW    .89

RETLW    .69
         RETLW    .59
         RETLW    .73
         RETLW    .90
         RETLW    .101
         RETLW    .95
         RETLW    .71
         RETLW    .81
```

FIGURE 13C

231PG02J - COPYRIGHT, MARCH 1994 SPAN, INC. & ADONIS, INC.   Page 4
AUTHOR: JOHN J. ROBINSON

```
         RETLW    .59
         RETLW    .66
         RETLW    .63
         RETLW    .100
         RETLW    .107
         RETLW    .79
         RETLW    .67
         RETLW    .77

RETLW    .59
         RETLW    .98
         RETLW    .89
         RETLW    .69
         RETLW    .61
         RETLW    .65
         RETLW    .103
         RETLW    .90

RETLW    .96
         RETLW    .70
         RETLW    .109
         RETLW    .97
         RETLW    .59
         RETLW    .81
         RETLW    .61
         RETLW    .75

ONE      SETC
         GOTO     BIT

ZERO     CLRC
         GOTO     BIT

DELAY    MOVWF    DLY
STRT     NOP
         MOVLW    .48      ;4MHZ
         MOVWF    CNT
         DECFSZ   CNT
         GOTO     !-1
         DECFSZ   DLY
         GOTO     STRT
         RETLW    0

DLYXMS   MOVWF    DLY
XMSLP    MOVLW    .249
         MOVWF    CNT
DLY1MS   NOP
         DECFSZ   CNT
         GOTO     DLY1MS
         DECFSZ   DLY
         GOTO     XMSLP
         RETLW    0

BIT      BNC      SZRO
         NOP
```

FIGURE 13D

231PG02J - COPYRIGHT, MARCH 1994 SPAN, INC. & ADONIS, INC.   Page 5
AUTHOR: JOHN J. ROBINSON

```
            CALL    ON
            MOVLW   ONET
            CALL    DELAY
            CALL    OFF
            MOVLW   ONESPC
            GOTO    DELAY

SZRO        CALL    ON
            MOVLW   ZROT
            CALL    DELAY
            CALL    OFF
            MOVLW   ZROSPC
            GOTO    DELAY

OFF         MOVLW   0
            TRIS    PRTB
            MOVLW   0FF
            MOVWF   PRTB
            RETLW   0

ON          MOVLW   0
            TRIS    PRTB
            MOVLW   0
            MOVWF   PRTB
            RETLW   0

INIT        MOVLW   00F
            TRIS    PRTA
            CALL    ON
            MOVLW   STRTSP
            CALL    DELAY
            CALL    OFF
            MOVLW   STRTSP
            CALL    DELAY
            CALL    ONE
            CALL    ZERO
            CALL    ONE
            CALL    ZERO
            CLRC
            BTFSC   PRTA,3
            SETC
            CALL    BIT
            CLRC
            BTFSC   PRTA,2
            SETC
            CALL    BIT
            CLRC
            BTFSC   PRTA,1
            SETC
            CALL    BIT
            CLRC
            BTFSC   PRTA,0
            SETC
            CALL    BIT
            CALL    ON
            CALL    TMOPRD
```

FIGURE 13E

231PG02J - COPYRIGHT, MARCH 1994 SPAN, INC. & ADONIS, INC.     Page 6
AUTHOR: JOHN J. ROBINSON

CALL    DLYXMS
    GOTO    INIT

ORG     1FF
    GOTO    INIT

END

REMOTE CONTROLLED SAFETY LIGHT HAVING INCREASED NOISE DISCRIMINATION

CROSS REFERENCE TO RELATED APPLICATIONS

The present application is a continuation-in-part of U.S. Ser. No. 08/169,973 now U.S. Pat. No. 5,353,008 filed Dec. 20, 1993, by Eikenberry, et al. which is a continuation of U.S. Ser. No. 07/877,296 now abandoned filed May 1, 1992, both assigned to the assignee of the present invention.

BACKGROUND OF THE INVENTION

The present invention relates generally to a vehicle safety equipment worn by an operator. More specifically, the present invention relates to a radio-controlled brake light having increased radio noise immunity.

Generally, vehicles such as motorcycles, bicycles, snowmobiles, all terrain vehicles (ATV), and other modes of transportation include brake lights which are mounted near a rear fender. This placement of the brake light is too close to the ground to be readily seen by operators of other vehicles. U.S. Pat. No. 4,760,393 issued to Reilly on Jul. 26, 1990 discloses a brake light mounted to a motorcycle helmet to more effectively provide warning of the braking operation. The apparatus in Reilly includes a transmitter coupled to a brake peddle on the motorcycle and a receiver circuit coupled to the brake light mounted to the motorcycle helmet. In operation, the transmitter produces an encoded signal when the brake peddle is depressed. The receiver circuit receives the encoded signal that includes a binary decoder which demodulates and decodes the signal. If the decoded signal matches a predetermined code within the receiver circuit, the receiver circuit turns on the brake light mounted to the helmet.

Vehicles such as motorcycles, bicycles and snowmobiles are often operated in groups of two or more. The encoded signal of one particular vehicle can interfere with the reception of an encoded signal by another vehicle, thereby causing erroneous operation of the brake light. More specifically, portions of the encoded signals from other transmitters may prevent a particular receiver from appropriately turning ON the remote-controlled brake light; this is a particular problem when several operators in a group initiate a brake operation almost simultaneously. Further, the receiver circuit may be triggered by spurious radio signals. The spurious radio signals may be the product of cellular phones, garage door openers, satellite transmissions, radar guns, and other radio frequency sources. Heretofore, prior art radio controlled brake lights have been susceptible to radio noise. Such prior art devices are disadvantageous because the brake light is not illuminated properly. Thus, there is a need for a radio controlled safety light which has superior noise immunity.

SUMMARY OF THE INVENTION

The present invention relates to a radio-controlled brake light system. The radio-controlled brake light system includes a transmitter, a receiver and a light source. The transmitter provides an encoded signal in response to a brake operation. The transmitter disables transmission of the encoded signal for a period of time after the encoded signal is transmitted. The receiver provides a control signal in response to the encoded signal. The receiver provides a control signal to the light source so that the light source

2 emits light for an amount of time after the encoded signal is received.

The present invention also relates to a method of illuminating a remote-controlled brake light in a brake light system including a transmitter and a receiver. The method comprises the steps of transmitting an encoded signal in response to a braking operation from the transmitter, preventing the transmitter from transmitting another encoded signal for a first period of time, and illuminating the brake light in response to the receiver receiving the encoded signal.

The present invention also relates to an apparatus for use with a helmet or other article. The apparatus includes an ID code circuit which stores a receiver ID code, an antenna, a receiver circuit coupled to the antenna, a control circuit coupled to the receiver circuit and the ID circuit, and a light source coupled to the control circuit. The receiver circuit receives an encoded signal at the antenna from an external source. The receiver circuit decodes the encoded signal to provide a transmitted ID code to the control circuit. Control circuit compares the transmitted ID code to the ID receiver code stored in the ID code circuit and provides a control signal for a predetermined amount of time when the transmitted ID code equals the ID receiver code. The light source emits light in response to the control signal.

In one aspect of the present invention, the transmitter provides an encoded signal comprised of a start bit and an identification (ID) code. The ID code is encoded with an advantageous protocol. The encoded signal operates to turn the brake light ON for a predetermined amount of time. In another aspect of the present invention, the transmitter is turned off (will not transmit another encoded signal) for a pseudo-random time period which is less than the ON time of the brake light. The above aspects of the invention enable superior noise immunity and operation of several remote-controlled brake lights in a small area.

In yet a further aspect of the present invention, the receiver is a duty cycled receiver which extends battery life. In yet another aspect of the present invention, a microprocessor in the receiver is put to sleep for particular amounts of time in order to extend battery life.

BRIEF DESCRIPTION OF THE DRAWINGS

The preferred exemplary embodiment of the present invention will hereinafter be described in conjunction with the appended drawings, wherein like designations denote like elements, and:

FIG. 3 is a block diagram of a transmitter associated with the assembly illustrated in FIG. 1;

FIG. 4 is a block diagram of a receiver associated with the assembly illustrated in FIG. 2;

FIG. 5A is a side view drawing of a lens associated with the assembly illustrated in FIG. 1;

FIG. 5B is a top view drawing of LEDs associated with the receiver illustrated in FIG. 4;

FIGS. 12A–C shows exemplary software for the receiver illustrated in FIG. 9; and FIGS. 13A–F shows exemplary software for the transmitter illustrated in FIG. 8.

DETAILED DESCRIPTION OF PREFERRED EXEMPLARY EMBODIMENTS OF THE PRESENT INVENTION

Figure 1:
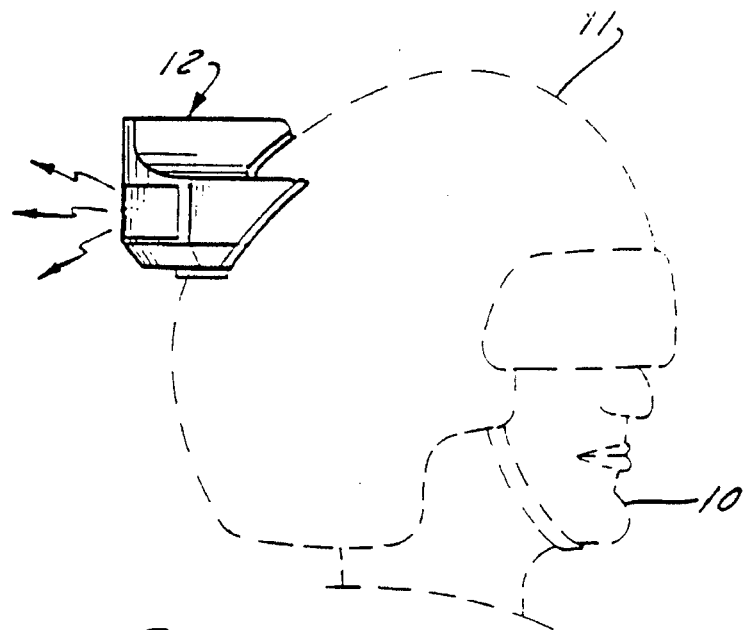
FIG. 1 is a drawing of a radio-controlled brake light assembly coupled to a motorcycle helmet in accordance with an exemplary embodiment of the present invention.

With reference to FIG. 1, a light attachment 12 is mounted on a motorcycle helmet 11. Although helmet 11 is shown as a motorcycle helmet, helmet 11 may be a bicycle helmet, snowmobile helmet or other article worn while riding a vehicle. An operator 10 wears helmet 11 when riding a motorcycle (not shown). Helmet 11 may be any headgear, protective article or other safety equipment. Preferably, helmet 11 is a standard motorcycle helmet such as a BELL® or other brand as is well known in the art.

Figure 2:
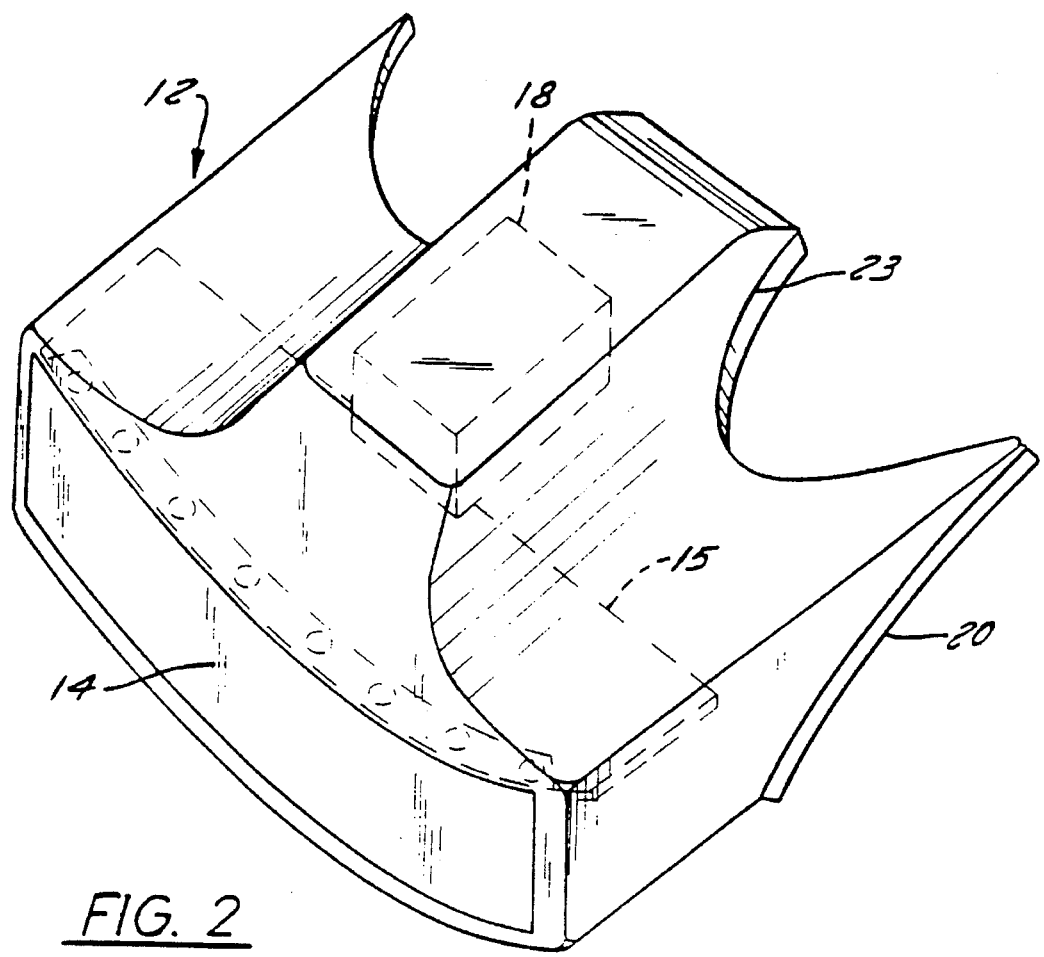
FIG. 2 is a more detailed drawing of the assembly illustrated in FIG. 1.

With reference to FIG. 2, a more detailed drawing of an attachment 12 in accordance with the preferred exemplary embodiment of the present invention includes a battery 18, an adhesive 20, a receiver 15, and a light 14. Attachment 12 is generally a device for holding the various components including battery 18, adhesive 20, receiver 15, and light 14. Preferably, attachment 12 includes a battery door. Attachment 12 is mounted on helmet 11 by means of adhesive 20. A side 23 of attachment 12 corresponds to the shape of helmet 11.

Preferably, adhesive 20 includes two rubber pads (not shown). The two rubber pads have adhesives or other glue-like substances on a first side and a second side. The first side of the rubber pads adheres to side 23 of attachment 12 which corresponds to external surface 23. The second side of the rubber pads also includes a paper backing. By removing the paper backing, an adhesive for sticking to the surface of helmet 11 is exposed. Attachment 12 is preferably mounted on the back or rear of helmet 11 so that a vertical center line of helmet 11 is matched to a vertical center line of attachment 12.

By pressing attachment 12 firmly onto helmet 11, the adhesive substance on the rubber pads hold attachment 12 to helmet 11. Preferably, adhesive 20 is of sufficient strength to hold attachment 12 to helmet 11 through most motorcycling conditions. Preferably, adhesive 20 is a foam mounting tape such as SLE-41-9485, ¼" neoprene foam manufactured by 3M. Generally, adhesive 20 may be replaced with mechanical or other means for holding attachment 12 on helmet 11.

With reference to FIG. 3, a transmitter 21 in accordance with the preferred exemplary embodiment of the present invention includes leads 22 and antenna 23. Transmitter 21 includes the transmitter circuit illustrated in FIG. 7 or the transmitter circuit illustrated in FIG. 9. Transmitter 21 should be installed on the back of the motorcycle (not shown) so that antenna 23 is not obstructed by any metal object. Thus, an unobstructed straight line should be provided between antenna 23 and attachment 12. Preferably, transmitter 21 is mounted to the motorcycle by means of an adhesive (not shown). The adhesive is generally similar to adhesive 20.

Leads 22 are wires that should be coupled to the rear lights of the motorcycle or snowmobile and grounded to the motorcycle or snowmobile frame. Preferably, a first wire is coupled to a first terminal on the rear brake light (not shown) on the motorcycle. A second wire is coupled to the motorcycle frame; the second wire provides a ground for the transmitter. Thus, when power is provided to the brake light, power is provided to transmitter 21 through leads 22. This interconnection to the brake light is advantageous because switches to a brake handle or a brake pedal are not required. However, if transmitter 21 is used with a bicycle or another application which does not utilize a brake light, a switch must be configured to provide a signal in response to a braking operation.

With reference to FIG. 4, a drawing of a receiver 15 in accordance with the preferred exemplary embodiment of the present invention is coupled to circuit board 17. Preferably, battery 18, antenna 16, circuit board 17, and receiver 15 are located in attachment 12. Circuit board 17 may include the receiver circuit illustrated in FIG. 6 on the receive circuit illustrated in FIG. 9. Battery 18 provides power to the various components associated with receiver 15. Particularly, circuit board 17 and light 14 are powered by battery 18. Preferably, battery 18 is a 9-volt battery, although receiver 15 and light 14 could be designed to use other battery sizes. Battery 18 may also be coupled to a solar cell (not shown). The solar cell may be configured to charge battery 18 as is well known in the art. Preferably, the solar cell is mounted to the top of helmet 18.

With reference to FIG. 5A, a lens 50 in accordance with the preferred exemplary embodiment of the present invention includes a plurality of spherical indentations 58. Preferably, lens 50 is made of a plastic having an index of reflection of approximately 1.5. Lens 50 is formed of plastic in an injection molding process as is well known in the art. Spherical indentations 58 are made by an end mill as is well known in the art. Spherical indentations 58 are preferably 0.032 inches deep and have a 0.1667 inch diameter. Preferably, spherical indentations 58 are arranged in five rows; each row is spaced 0.1643 inches apart. Each spherical indentation 58 is spaced 0.1643 inches apart from the next spherical indentation 58 in its row.

Lens 50 has a height of approximately 0.95 inches. An outside surface of lens 50 from a point A to a point B is an arc of a circle having a radius of approximately 3.55 inches.

LEDs 52 are super bright LEDs such as the HLMP8100 LED manufactured by Hewlett-Packard. LEDs 52 are electrically coupled to circuit board 56 via conductors 54. Conductors 54 are bent at a right angle so that LEDs 52 are 0.5 inches from circuit board 56.

With reference to FIG. 5B, a top view of circuit board 56 includes LEDs 52 in accordance with the preferred exemplary embodiment of the present invention. The outside surface of lens 50 from a point C to a point D preferably is an arc of a circle having a radius of approximately 4.957 inches. Circuit board 56 may be integral with circuit board 17.

LEDs 52 are spaced approximately 11/32 inch apart along an arc of a circle having an approximately 4.04 inch radius. LEDs 53 are situated along an arc of a circle having an approximate 3.97 inch radius, and LEDs 53 are 11/16 of an inch from the closest LED 52. Lens 50 is situated on a 4.957 radius approximately 15/16 of an inch from LEDs 52 and 1 1/16 inch from LEDs 53. The arcs associated with lens 50, LEDs 50 and LEDs 53 are concentric.

The arrangement of LEDs 52 and LEDs 53 and lens 50 provides optimum light transmission. Spherical indentations 58 spread out light from LEDs 52 and the exterior surface of lens 50 focuses the light from LEDs 52. Light emitted from lens 50 may be seen from approximately 300 feet away. Thus, lens 50 provides an advantageous means of providing optimum light visibility.

Figure 6:
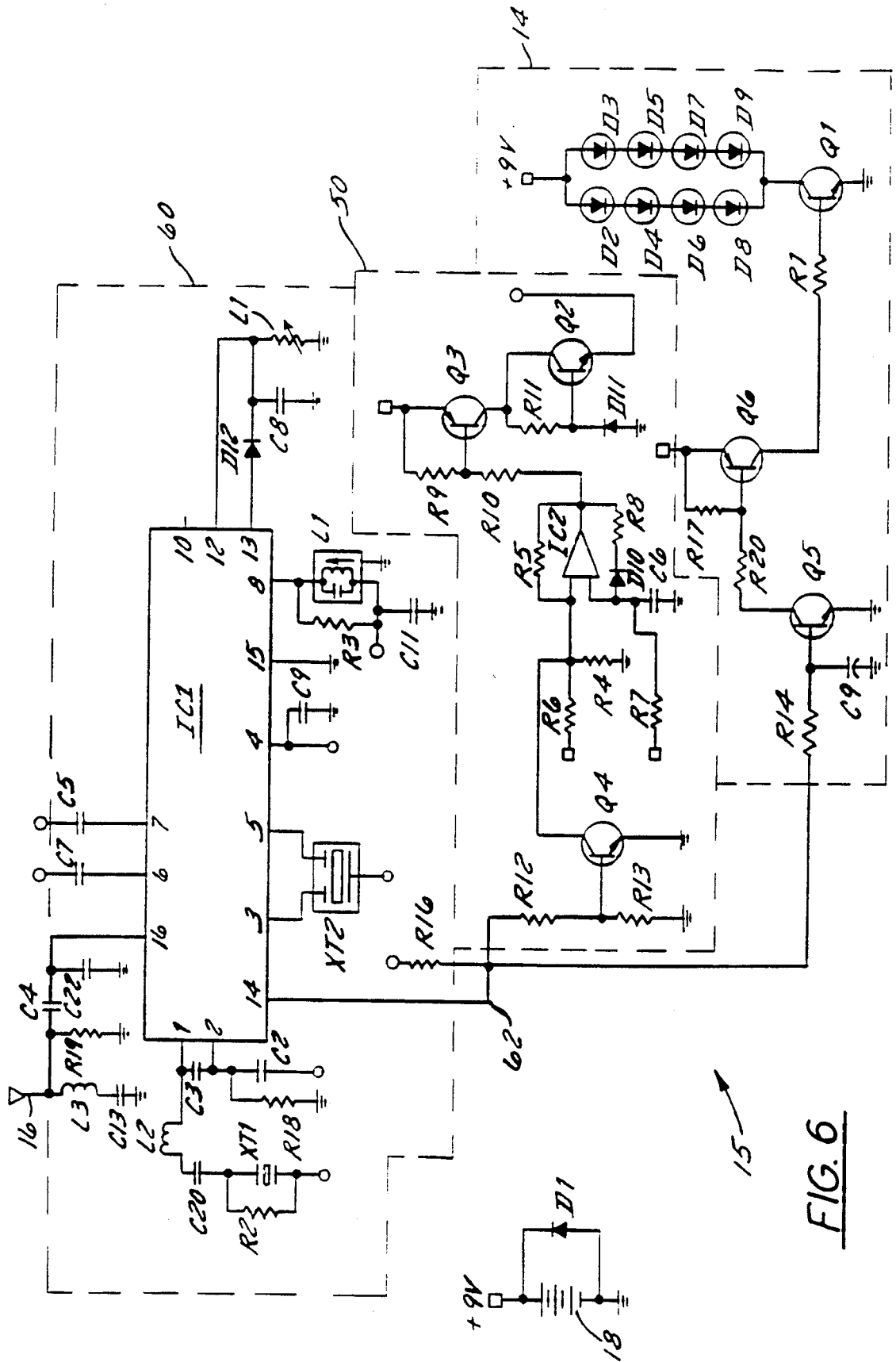
FIG. 6 is a detailed electrical schematic of the receiver illustrated in FIG. 4 in accordance with a first preferred exemplary embodiment of the present invention.

With reference to FIG. 6, a detailed schematic of a receiver 15 in accordance with the preferred exemplary embodiment of the present invention includes receiver control circuit 60, duty cycle generator 50, battery 18, and light 14. Receiver 15 is preferably a duty cycled receiver which is powered by duty cycle generator 50. Duty cycle generator 50 is a pulse signal generator circuit for providing a low power mode for receiver 15. Receiver control circuit 60 is an RF receiver circuit for receiving an external signal from transmitter 21. Although control circuit 60 and transmitter 21 could be designed to communicate through various media such as light or sound, receiver control circuit 60 preferably receives a radio frequency (RF) signal produced by transmitter 21.

Receiver control circuit 60 is coupled to duty cycle generator 50 via a conductor 62. Receiver control circuit is provided a pulsed +5V signal by duty cycle generator 50 at various connections shown in FIG. 6. Receiver control circuit 60 is also coupled to light 14 via conductor 62. Battery 18 provides a +9V signal to duty cycle generator 50 and light 14.

Duty cycle generator 50 includes a resistor R13, a transistor Q4, a resistor R6, a resistor R7, a resistor R4, a capacitor C6, a diode D10, a resistor R8, a resistor R5, an amplifier IC2, a resistor R10, a resistor R9, a transistor Q3, a resistor R11, a diode D11, and a transistor Q2. A first end of resistor R12 is coupled to conductor 62. A second end of resistor R12 is coupled to a first end of resistor R13 and the base of transistor Q4. A second end of resistor R13 is coupled to ground. The emitter of transistor Q4 is coupled to ground, and the collector of transistor Q4 is coupled to a first end of resistor R4.

The +9V signal is coupled to a first end of resistor R6, and a second end of resistor R6 is coupled to the first end of resistor R4. The second end of resistor R4 is coupled to ground. The first end of resistor R4 is coupled to the positive terminal of amplifier IC2 and a first end of resistor R5. A second end of resistor R5 is coupled to the output of amplifier IC2, a first end of resistor R10 and a second end of resistor R8. A first end of resistor R8 is coupled to the cathode of diode D10. The anode of diode D10 is coupled to the negative terminal of amplifier IC2, a first end of capacitor C6, and a second end of resistor R7. A second end of capacitor C6 is coupled to ground. A first end of resistor R7 is coupled to the +9V signal.

A second end of resistor R10 is coupled to the base of transistor Q3 and a first end of resistor R9. The +9V signal is coupled to a second end of resistor R9 and the emitter of capacitor Q3. The collector of transistor Q3 is coupled to a first end of resistor R11 and the collector of transistor Q2. A second end of resistor R11 is coupled to the base of transistor Q2 and the anode of diode D11. The cathode of diode D11 is coupled to ground. The emitter of transistor Q2 provides the pulsed +5V signal.

Receiver control circuit 60 includes a potentiometer 61, a capacitor C8, a diode D12, a coil L1, a resistor R3, a capacitor C11, a capacitor C9, a crystal XT2, a resistor R16, a capacitor C2, a capacitor C3, an inductor L2, a capacitor C20, a resistor R2, a crystal XT1, a capacitor C22, a capacitor C4, a capacitor C5, a capacitor C7, an inductor L3, a capacitor C13, a resistor R19, and a resistor R18. Receiver control circuit 60 also includes integrated chip IC1 and antenna 16.

Antenna 16 is coupled to a first end of inductor L3, a first end of resistor R19, and a first end of capacitor C7. A second end of inductor L3 is coupled to a first end of capacitor C13, and a second end of capacitor C13 is coupled to ground. A second end of resistor R19, a first end of capacitor C22, and a second end of capacitor C22 are coupled to ground. A first end of capacitor C22 is coupled to a second end of capacitor C4 and a pin 16 of integrated circuit IC1.

A pin 16 of integrated circuit IC1 is coupled to a second end of capacitor C7. A first end of capacitor C7 and a first end of capacitor C5 are coupled to the pulsed +5V signal. A second end of capacitor C5 is coupled to a pin 7 of chip IC1. A pin 12 of chip IC1 is coupled to a first end of potentiometer 61, the cathode of diode D12, and a first end of capacitor C8. The anode of diode D12 is coupled to a pin 13 of chip IC1. A second end of capacitor C8 and a second end of potentiometer 61 are coupled to ground.

A pin 8 is coupled to a first end of a resistor R3. A second end of coil L1 is coupled to a first end of capacitor C11. A second end of capacitor C11 is coupled to ground. A second end of resistor R3 and a first end of capacitor C11 is coupled to the pulsed +5V signal. A pin 15 on chip IC1 is coupled to ground on chip IC1.

A second end of capacitor C9 is coupled to ground and a first end of capacitor C9 is coupled to a pin 4 of chip IC1. A pin 4 of chip IC1 is also coupled to the pulsed +5V signal. A first pin on crystal XT2 is coupled to the pulsed +5V signal, and a second pin on crystal XT2 is coupled to a pin 3 of chip IC1. A third pin on crystal XT2 is coupled to a fifth pin on chip IC1.

A pin 14 of chip IC1 is coupled to conductor 62. A first end of resistor R18 is coupled to the pulsed 5V signal. A second end of resistor R16 is coupled to conductor 62.

A first end of capacitor C2 is coupled to the pulsed +5V signal. A second end of capacitor C2 is coupled to a pin 2 of chip IC1, a first end of capacitor C3, and a first end of resistor R18. A second end of resistor R18 is coupled to ground. A second end of capacitor C3 is coupled to a first pin of chip IC1 and a first end of inductor L2. A second end of inductor L2 is coupled to a first end of capacitor C20. A second end of capacitor C20 is coupled to a first end of crystal XT1 and a first end of resistor R2. A second end of resistor R2 and a second end of crystal XT1 are coupled to the pulsed +5V signal.

Battery 18 provides the +9V signal. The anode of diode D1 is coupled to ground and the cathode of diode D1 is coupled to the +9V signal.

Light 14 is a light source including a diode D2, a diode D3, a diode D4, a diode D5, a diode D6, a diode D7, a diode D8, and a diode D9. Light 14 also includes a transistor Q1, a resistor R1, a transistor Q6, a resistor R17, a resistor R20, a transistor Q5, a capacitor C9, and a resistor R14. A first end of resistor R14 is coupled to conductor 62. A second end of resistor R14 is coupled to a first end of capacitor C9 and the base of transistor Q5. A second end of capacitor C9 is coupled to ground. The emitter of transistor Q5 is coupled to ground. The collector of transistor Q5 is coupled to a first end of resistor R20.

A second end of resistor R20 is coupled to a first end of resistor R17 and the base of transistor Q6. A second end of resistor R17 is coupled to the +9V signal and the emitter of transistor Q6. The collector of transistor Q6 is coupled to a first end of resistor R1.

A second end of resistor R1 is coupled to the base of transistor Q1. The collector of transistor Q1 is coupled to the cathode of diode D8. The anode of diode D8 is coupled to the cathode of diode D6. The anode of diode D6 is coupled to the cathode of diode D4. The anode of diode D4 is coupled to the cathode of diode D2. The anode of diode D2 is coupled to the +5V signal. The 5V signal is also coupled to the anode of diode D3. The cathode of diode D3 is coupled to the anode of diode D5. The cathode of diode D5 is coupled to the anode of diode D7. The cathode of diode D7 is coupled to the anode of diode D6. The cathode of diode D6 is coupled to the collector of transistor Q1. The emitter of transistor Q1 is coupled to ground. Diodes D2, D3, D4, D5, D6, D7, D8 and D9 are light emitting diodes (LEDs). LEDs D2, D3, D4, D5, D6, D7, D8, and D9 are preferably arranged as LEDs 52 and 53 discussed with reference to FIGS. 4A and 4B.

Figure 7:
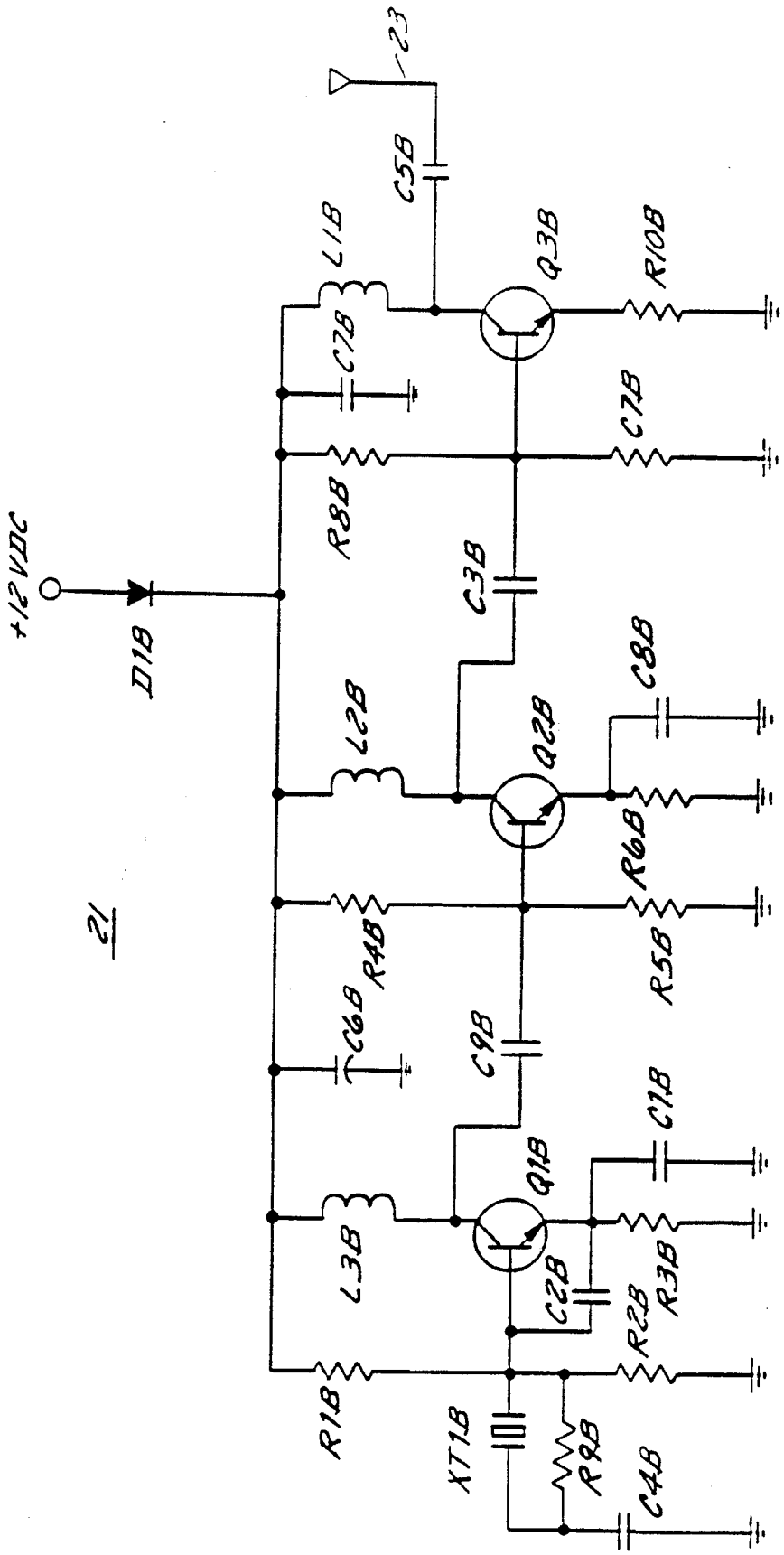
FIG. 7 is a detailed electrical schematic of the transmitter illustrated in FIG. 3 for use with the receiver illustrated in FIG. 6.

With reference to FIG. 7, transmitter 21 in accordance with the first preferred exemplary embodiment of the present invention is coupled to antenna 23. Transmitter 21 provides an approximately 40 MHz RF signal when a +12V signal is provided. Preferably, leads 22 provide transmitter 21 a +12VDC signal when the motorcycle brake light is ON.

Transmitter 21 includes a diode D1B, a resistor R1B, an inductor L3B, a capacitor C6B, a resistor R4B, an inductor L2B, a resistor R8B, a capacitor C7B, an inductor L1B, a capacitor C5B, a transistor Q3B, a resistor R7B, a capacitor C3B, a transistor Q2B, a capacitor C8B, a resistor R6B, a resistor R5B, a capacitor C9B, a transistor Q1B, a capacitor C1B, a resistor R3B, a capacitor C2B, a resistor R2B, a resistor R9B, a capacitor C4B, and a crystal XT1B. Antenna 23 is coupled to a first end of capacitor C5B. A second end of capacitor C5B is coupled to the collector of transistor Q3B and a first end of inductor L1B. The emitter of transistor Q3B is coupled to ground.

A second end of inductor L1B is coupled to a first end of capacitor C7B, the cathode of diode D1B, a first end of resistor R8B, the second end of inductor L1B a first end of inductor L2B, a first end of resistor R4B, a first end of capacitor C6B, a first end of inductor L3B, and a first end of resistor R1B. A second end of capacitor C7B is coupled to ground. A second end of resistor R8B is coupled to the base of transistor Q3B and a first end of capacitor C3B and a first end of resistor R7B. A second end of resistor R7B is coupled to ground. A second end of capacitor C3B is coupled to a second end of inductor L2B and the collector of transistor Q2B. The emitter of transistor Q2B is coupled to a first end of resistor R6B and a first end of capacitor C8B. A second end of capacitor C8B and a second end of resistor R6B are coupled to ground. A second end of resistor R4B is coupled to the base of transistor Q2B, a first end of resistor R5B and a first end of capacitor C9B. A second end of resistor R5B and a second end of capacitor C6B are coupled to ground.

A second end of inductor L3B is coupled to the collector of transistor Q1B and a second end of capacitor C9B. The emitter of transistor Q1B is coupled to a first end of resistor R3B, a second end of capacitor C2B and a first end of capacitor C1B. A second end of resistor R3B and a second end of capacitor C1B are coupled to ground. A second end of resistor R1B is coupled to the base of transistor Q1B, a first end of capacitor C2B, a first end of crystal XT1B, a first end of resistor R9B, and a first end of resistor R2B. A second end of resistor R2B is coupled to ground. A second end of crystal XT2B is coupled to a first end of capacitor C4B and a first end of resistor R9B. A second end of resistor R9B is coupled to ground. The anode of diode D1B is coupled to the +12V signal. The +12V signal is zero volts when the brake is not depressed and +12V when the brake is depressed. This is accomplished by coupling the proper one of leads 22 to the proper terminal of the brake light (not shown) on the motorcycle. When the brake pedal is depressed, the terminal is provided +12V by the motorcycle and the brake light (not shown) is illuminated. Thus, whenever the brake is depressed, a +12V signal is provided to transistor 21.

With reference to FIGS. 6 and 7, the operation of a system including receiver 15 and transmitter 21 are described as follows. The preferred values of the various circuit components associated with transmitter 21 and receiver 15 are given in Table I. Preferably, chip IC1 is a low power narrow band FM receiver such as an MC3371.

As discussed above, transmitter 21 is connected to the brake light (not shown) of the motorcycle so that a +12V power source is provided to the anode of diode D1B when the brake light is on. As is known in the art, the motorcycle (not shown) turns the brake light on in response to a brake operation. Diode D1B provides reverse polarity protection and capacitor C6B0 is an electrolytic capacitor for providing power filtering operations.

Transmitter 21 preferably utilizes a crystal controlled oscillator for frequency stability over a wide operating temperature range. Preferably, transmitter 21 utilizes a Colpitts oscillator including transistor Q1B, capacitors C1B, C2B and C4B, and 40.680 MHz crystal XT1B with bias resistors R1B, R2B and R3B. Inductor L3 is used for impedance matching and oscillator tuning to attenuate unwanted signals. Thus, transmitter 21 includes a resonant or tuned oscillator circuit for generating a 40.68 MHz signal. This 40.68 MHz signal is then amplified by a pre-amp stage consisting of transistor Q2B, with bias resistors R4B, R5B and R6B. Capacitor C5B is used for swamping the emitter of Q2B (increasing AC gain while not increasing DC emitter current.) Inductor L2B is used for impedance matching and tuning to attenuate unwanted signals. The output of this pre-amp stage (taken from the collector of Q2B) is then coupled by capacitor C3B to the power amplifier consisting of resistors R7B, R8B, and R10B, and inductor L1B and transistor Q3B before being coupled to antenna 23 via capacitor C5B.

The collector of transistor Q2B provides a 40 MHz signal to the base of transistor Q3B. Capacitor C3B couples the collector of transistor Q2B to the base of transistor Q3B. Transistor Q3B, resistor R8B, resistor R7B, capacitor C7B, inductor L1B, and capacitor C5B operate to provide a power amplifier. The 40 MHz signal at the base of transistor Q3B is amplified and provided to antenna 23.

Although transmitter 21 is shown utilizing a Colpitts oscillator, various oscillators could be used. Further, although transistor 21 utilizes a crystal XT1B, other sources of signal generation may be used. Further, other designs of transmitter 21 are known in the art which could be used to provide a signal to antenna 23. Therefore, transmitter 21 operates to provide an approximately 40 MHz electromagnetic signal which is radiated by antenna 23 when a +12V power source is provided by the brake light on the motorcycle (not shown).

With reference to FIG. 6, receiver control circuit 60 is not constantly provided power. Receiver control circuit 60 is powered by the pulsed +5V signal. The pulse +5V signal is provided by duty cycle generator 50. Thus, receiver 15 is a duty cycled receiver circuit.

Conductor 62 is a logic low (approximately ground) when receiver control circuit 60 is not provided power by the pulse +5V signal or when an external signal such as the RF signal from transmitter 21 is not provided to receiver 15. When conductor 62 is at a logic low, transistor Q4 is OFF.

When transistor Q4 is OFF, amplifier IC2 preferably provides duty cycle signal at the output of amplifier IC2. Amplifier IC2 is preferably configured as a comparator for providing a 0 to 9 volt signal. Preferably, the resistor R7, capacitor C6 and resistor R8 provide RC values so that the signal at the output of amplifier IC2 is approximately 0 VDC for approximately 0.13 seconds and approximately +9VDC for approximately 0.02 seconds. This configuration provides an approximately 7 Hz signal at the output of amplifier IC2. Duty cycle generator 50 may be designed to provide various other duty cycles. Preferably the duty cycle is from approximately 1% to 50%.

Transistor Q3 is turned OFF in response to a 9V signal at the output of amplifier IC2. Transistor Q3 is also turned ON in response to a 0 volt signal provided at the output of amplifier IC2. Thus, the collector of transistor Q3 provides an approximately 8.3 volt signal when the voltage at the output of amplifier IC2 is low and provides an approximately 0V signal when the output of amplifier IC2 is high. When the collector of transistor Q3 is approximately +8.3 VDC, transistor Q2 provides an approximately +5V signal at the emitter of transistor Q2. When the voltage at the collector of transistor Q3 is approximately 0V, the emitter of transistor Q2 provides an approximately 0V signal.

Diode D11 is a 5.6V zener diode. Diode 11 provides a stable 5.6V signal for the base of transistor Q2. Thus, the emitter of transistor Q2 provides a 0.02 second 5V signal followed by an approximately 0.13 second 0V signal when conductor 62 is low.

Conductor 62 is high when the pulsed +5V signal is at 5 volts and antenna 16 is receiving a 40.680 MHz ± 5 KHz RF signal. When conductor 62 is high, transistor Q4 is turned on. When transistor Q4 is turned on, the non-inverting input of amplifier IC2 is approximately 0 volts. When the non-inverting input is approximately 0 volts, the inverting input of amplifier IC2 is greater than the non-inverting input of amplifier IC2. Thus, when the non-inverting input of amplifier IC2 is 0 volts, the output of amplifier IC2 is approximately ground potential.

As discussed above, when the output of amplifier IC2 is 0 volts or approximately ground, transistor Q3 is turned on and transistor Q2 provides an approximately 5 volt signal at the emitter of Q2. This 5 volt signal at the emitter of transistor Q2 is the pulsed 5V signal. Thus, when conductor 62 is high, the pulsed 5V signal is held at +5V. Thus, duty cycle signal generator 50 provides a duty cycled signal when conductor 62 is low and provides a constant 5V signal when conductor 62 is high.

As discussed above, receiver control circuit 60 receives power from the pulsed +5V signal. When the pulsed +5V signal is approximately 5V, chip IC1 is powered and ready to receive a RF signal at antenna 16.

Receiver control circuit 60 is coupled to antenna 16. Inductor L3, resistor R19, capacitor C13, capacitor C4 and capacitor C22 provide a network for receiving the RF signal from transmitter 21 and to filter out citizen band (CB) radio signals (27 MHz). The network including inductor L3, capacitor C4, and resistor R19 and chip IC1 at pin 16 are tuned to receive a particular frequency at antenna 16. Preferably, the network is tuned to receive a 40 MHz FM signal.

Chip IC1 mixes the signal at pin 16 with an intermediate frequency (IF) signal. The IF signal is provided by an internal oscillator and the network coupled to pins 1 and 2 of chip IC1. Particularly, inductor L2, capacitor C3, resistor R18, capacitor C2, capacitor C20, crystal XT1, and resistor R2 provide a 40.225 MHz IF signal. Preferably, chip IC1 includes an internally biased Colpitts oscillator with collector, base, and emitter connections at pins 4, 1, and 2 respectively. Chip IC1 outputs the signal from the internal mixer at pin 3.

The operation of the various circuit components coupled to receiver control circuit 60 are discussed throughout literature associated with chip IC1. The various interconnections between components associated with chip IC1 are generally well known in the art.

Pin 3 provides an output for the internal mixer. The signal at pin 3 of chip IC1 is filtered by crystal XT2 which is preferably a ceramic band pass filter for IF filtering. Preferably, crystal XT2 has a band width of ±5 KHz. Crystal XT2 provides a filtered signal to pin 5 of chip IC1.

Pin 5 of chip IC1 is coupled to a first input to a limiter IF amplifier which is internal to chip IC1. Thus, the limiter IF amplifier receives the signal from crystal XT2. The limiter IF amplifier provides a received strength signal indicator (RSSI) at pin 13. The RSSI signal is used to detect the presence of a carrier signal. Thus, when a carrier signal is present at antenna 16, pin 13 provides a signal.

The limiter amplifier has a second input coupled to capacitor C7. The first input of limiter IF amplifier is also coupled to capacitor C5 at pin 7. The internal limiter IF amplifier provides the RSSI signal in response to these inputs.

When pin 13 provides current source of 60 microamps, diode D12 conducts and capacitor C8 is charged. Thus, RSSI output provides a signal at pin 12 of chip IC1. If pin 12 is below 0.9 volts, pin 14 is internally shorted to ground. Thus, when pin 14 is shorted to ground, an approximately 0 volt signal is applied to conductor 62. Preferably, approximately 0.67 mv of hysterisis is provided at pin 12 to prevent jitter. Potentiometer 61 is a 1 meg potentiometer which allows the manufacturer or user to set the level at which pin 14 is brought to ground. Thus, potentiometer 61 provides a trigger level at which chip IC shorts conductor 62 to ground in response to the RSSI signal. Thus, when antenna 16 receives a strong enough carrier signal, the RSSI signal is provided through diode D12 and into pin 12 so that pin 12 is not below 0.9 volts and pin 14 is not shorted to ground. Therefore, when the signal at antenna 16 is not strong enough, sufficient current is not provided through diode D12 and the voltage at pin 12 is below 0.9 volts. When pin 12 is below 0.9 volts, pin 14 is shorted to ground. Potentiometer 61 and capacitor C8 provide an RC network for discharging the voltage level at pin 12.

An LCR tank circuit is coupled to pin 8. This LCR tank circuit consists of resistor R3, and LC tank circuit L1. The LCR tank circuit provides a 90 degree phase shift at the IF center frequency and enables recovered audio.

Light 14 is coupled to conductor 62 when conductor 62 is high. Resistor R14 provides current limiting to transistor Q5, and resistor R14 and capacitor C1 provide an RC time constant so that transistor Q5 remains off for a predetermined amount of time after conductor 62 goes high. This RC constant prevents improper flickering of light 14 in response to changing signals on conductor 62.

When transistor Q5 is turned on, transistor Q6 is turned on. When transistor Q6 is turned on, transistor Q1 is turned on. When transistor Q1 is turned on, current flows from battery 18 through diodes D2, D4, D6, and D8 and through diodes D3, D5, D7, and D9. When current flows through diodes D2, D3, D4, D5, D6, D7, D8, and D9, light is produced.

When conductor 62 is low, capacitor C1 is discharged through resistor 14 and transistor Q5 is turned off. When transistor Q5 is turned off, transistor Q6 is turned off. When transistor Q6 is turned off, transistor Q1 is turned off. When transistor Q1 is turned off, current does not flow from battery 18 through diodes D2, D4, D6, D8 and through diodes D3, D5, D7 and D9. Thus, when conductor 62 is low, light is not produced by diodes D2, D3, D4, D5, D6, D7, D8, and D9.

Figure 8:
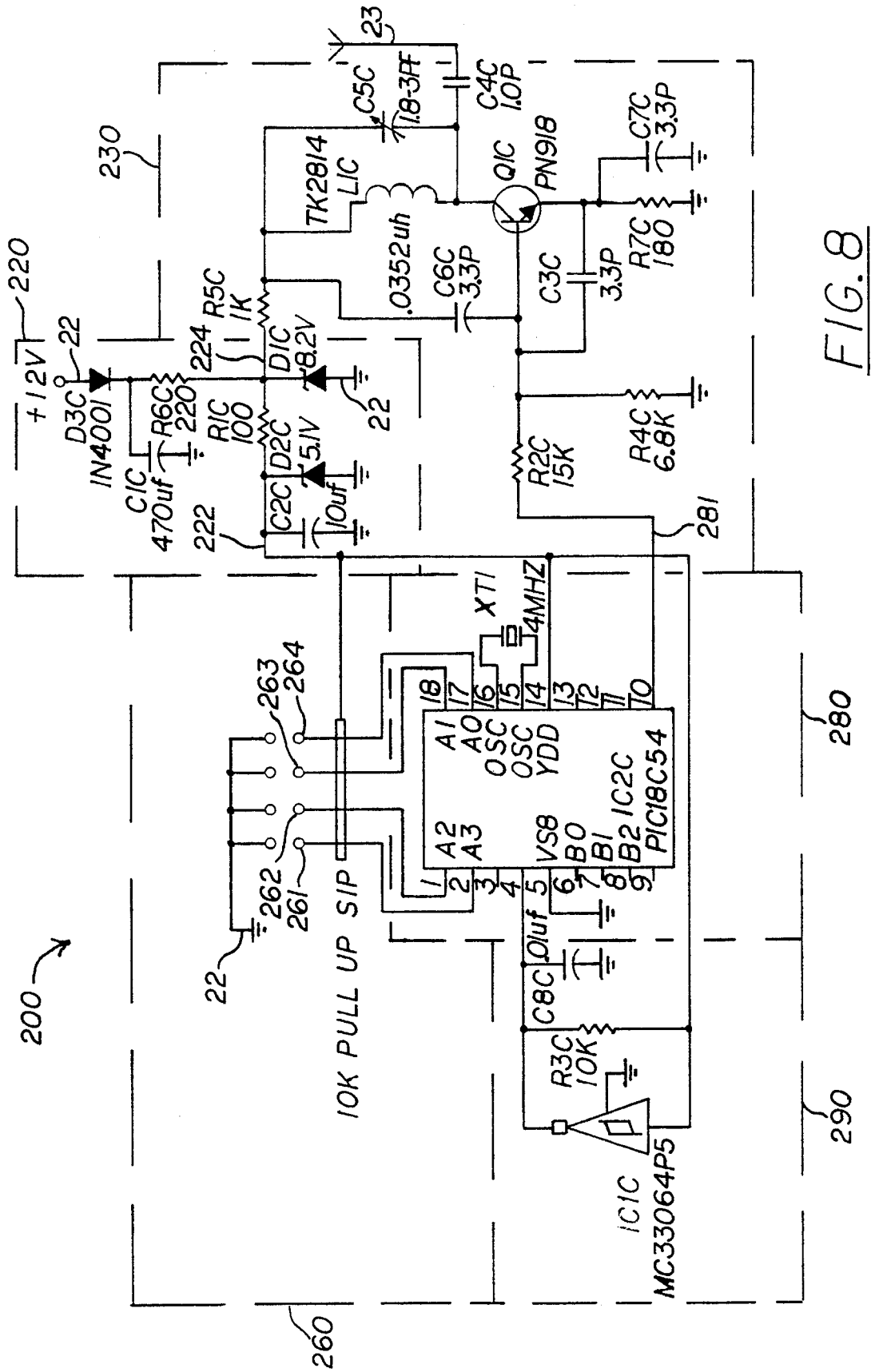
FIG. 8 is a detailed electrical schematic of the transmitter illustrated in FIG. 3 in accordance with a second preferred exemplary embodiment of the present invention.

With reference to FIG. 8, transmitter 21 may include a transmitter circuit 200 in accordance with the second preferred exemplary embodiment of the present invention. Transmitter circuit 200 is coupled to antenna 23 and utilizes an encoding and protocol scheme to provide superior noise immunity and allow operation of several transmitter circuits 200 in a small area.

Transmitter circuit 200 is preferably configured to provide a 310 or 390 megahertz (MHz) encoded amplitude modulated (AM) RF signal when approximately between 8–30 volts is provided across leads 22 when the brake light of the motorcycle, snowmobile or other vehicle is ON. Transmitter circuit 200 includes a power circuit 220, an RF generator 230, an identification (ID) ID code circuit 260, a microprocessor circuit 280, and a reset circuit 290.

Power circuit 220 is coupled between leads 22 and includes a diode D3C, a diode D1C, and a diode D2C. Diode D3C has an anode coupled to the power lead of leads 22 and rectifies any AC power provided on leads 22. For example, diode D3C advantageously rectifies the 12 volt AC power utilized in snowmobiles to illuminate the brake light. The rectified signal is provided through a resistor R1C to diode D2C. Diode D2C provides a 5 VDC power source to ID code circuit 260, microprocessor circuit 280, and reset circuit 290 when the brake light (not shown) of the vehicle is illuminated. Also, diode D1C provides an 8 VDC power source to RF generator 210 at a conductor 224 when the brake light of the vehicle is illuminated.

ID code circuit 260 is comprised of four single pull-up resistors. The pull-up resistors are coupled to microprocessor circuit 280 via conductors 261, 262, 263 and 264. Preferably, conductors or lines 261–264 are thin printed circuit board conductors which may be cut upon installation to provide a particular 4 bit transmitter ID code to microprocessor circuit 280. ID code circuit 260 is able to provide a four bit ID code (transmitter ID code) indicative of 1 of 16 possible identifications. Alternatively, ID code circuit 260 may include more pull-resistors, dip switches, static memory, PROM devices, or other devices for providing an ID code.

Reset circuit 90 includes a reset chip IC1C, a resistor R3C, and a capacitor C8C. Reset circuit 90 appropriately resets a microprocessor IC2C in microprocessor circuit 280. Preferably, reset circuit 290 resets microprocessor IC2C just after microprocessor IC2C is powered by the 5 VDC signal. Thus, when power circuit 220 provides the 5 VDC signal to microprocessor circuit 280, microprocessor IC2C is preferably reset and begins operation of a software program. An exemplary software program for transmitter circuit 200 is shown in FIGS. 13A–F and discussed in more detail with reference to FIG. 11. Microprocessor circuit 280 preferably performs the logic and control operations for transmitter circuit 200. More particularly, microprocessor circuit IC2C provides logic signals in accordance with an advantageous protocol at conductor 281 which are indicative of the transmitter ID code stored in ID code circuit 260.

RF generator 210 is coupled to antenna 23 and receives the 8 VDC power at a conductor 224. RF generator 210 provides an AM carrier frequency signal to antenna 23 for transmission to attachment 12 (FIG. 1). The carrier frequency is preferably at 310 or 390 MHz signal or other frequency in accordance with rules or guidelines of federal regulatory agencies such as the FCC. The logic signals provided by microprocessor circuit 280 at conductor 281 are provided across resistor R2C and received by a transistor Q1D of RF generator 210.

RF generator 210 preferably modulates the carrier signal in accordance with the logic signals provided by microprocessor circuit 280. When microprocessor IC2 provides a logic high at conductor 281, transistor Q1C is biased ON so that a carrier frequency signal is provided at antenna 23 (carrier signal present). When microprocessor IC2C provides a logic low at conductor 281, transistor Q1C is turned OFF so that no carrier frequency is provided at antenna 23 (carrier signal absent). Therefore, microprocessor IC2C is able to modulate the carrier signal in accordance with the logic signals provided at conductor 281. Microprocessor IC2C is able to encode the AM RF signal with the transmitter ID code stored in ID code circuit 260.

Figure 9:
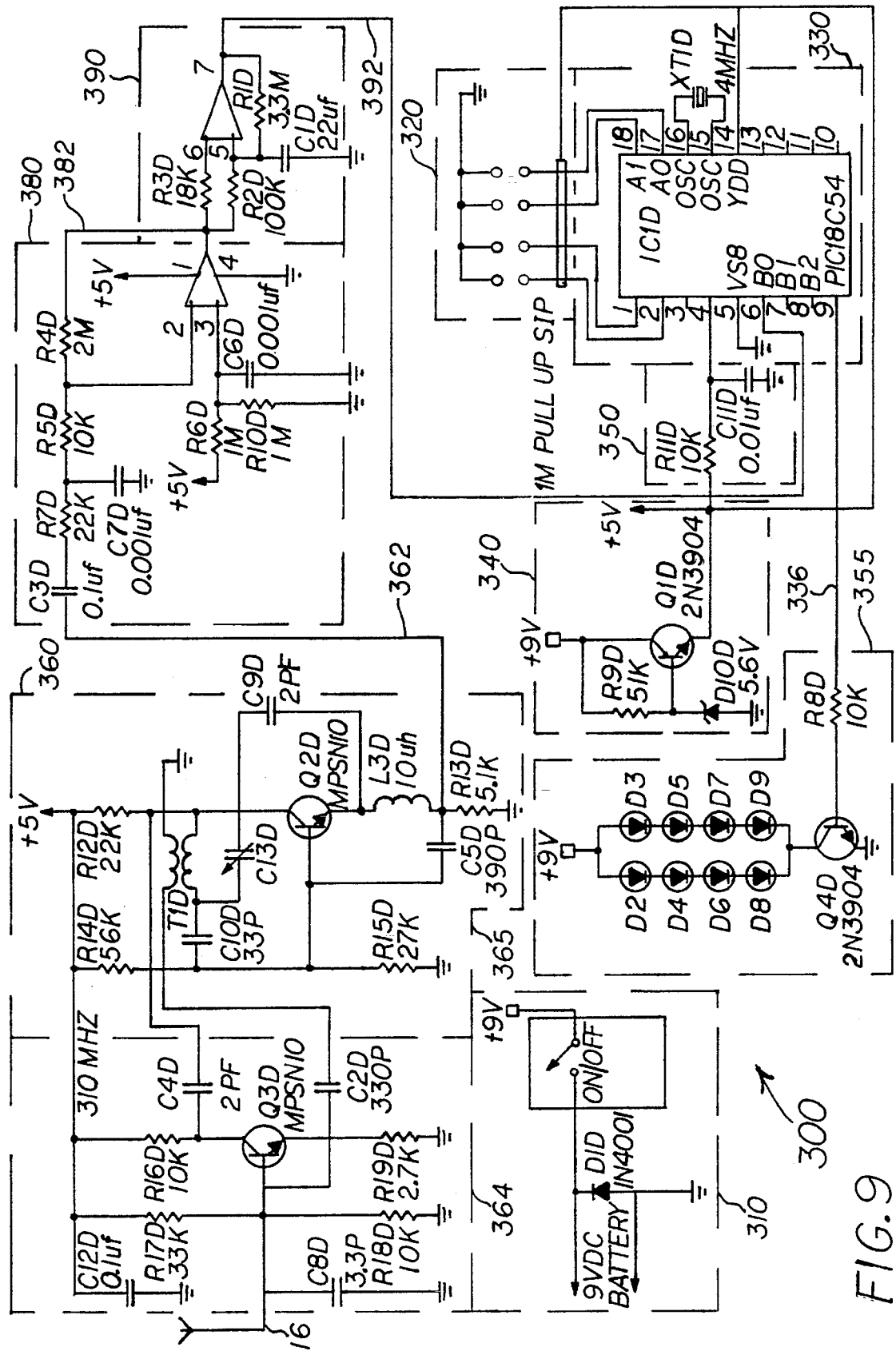
FIG. 9 is a detailed electrical schematic of the receiver of the receiver illustrated in FIG. 4 for use with the transmitter illustrated in FIG. 8.

With reference to FIG. 9, a receiver circuit 300 can be used on circuit board 17 (FIG. 4). Receiver circuit 300 is configured to receive the encoded signal from transmitter circuit 200 and includes a battery circuit 310, and ID code circuit 320, a microprocessor circuit 330, a 5 volt regulator circuit 340, a reset network 350, a regenerative receiver 360, an amplifier 380, a comparator 390, and a brake light control circuit 355. Regenerative receiver 360 is coupled to antenna 16 and receives the encoded AM signal from circuit 200.

Regenerative receiver 360 includes an amplifier 364 and an oscillator 365. A transistor Q3D in amplifier 364 is configured to amplify the encoded signal received at antenna 16. Oscillator 365 which includes a transistor Q2D is tuned to the carrier frequency of the AM signal and discriminates non-carrier frequency signals. Oscillator circuit 365 preferably provides the encoded signal at conductor 362. Regenerative receiver 360 is preferably a low current, low power receiver. Alternatively, regenerative receiver 360 or receiver circuit 300 could be configured to be a duty-cycled receiver as discussed with reference to FIGS. 6–7.

Amplifier circuit 380 receives the encoded AM signal. Amplifier 380 further includes a low pass filter comprised of a resistor R7D and a capacitor C7D. Resistor R7D and capacitor C7D are tuned to demodulate or remove the carrier frequency from the encoded signal. Therefore, amplifier 380 provides a demodulated encoded signal representative of the amplitude modulation. Operational amplifier IC2D is configured to provide a gain of 200 to the demodulated signal received at conductor 385.

Comparator 390 is an inverting comparator which compares the demodulated signal at conductor 382 to a threshold. A low pass filter comprised of resistor R2D and a capacitor C1D set the threshold for comparator 390 to the DC offset associated with the demodulated signal. Resistor R1D provides hysterisis to prevent unnecessary ON/OFF cycling of comparator 390. Comparator 390 provides greater discrimination between logic highs and logic lows provided at conductor 382. Therefore, comparator 390 provides receiver logic signals at conductor 392 indicative of the state of the demodulated signal (the presence or absence of the AM signal at antenna 16).

Microprocessor circuit 330 includes a microprocessor IC1D coupled with conductor 392. Microprocessor IC1D receives the receiver logic signals at conductor 392, interprets the receiver logic signals to obtain the transmitted ID code, and compares the transmitted ID code to the receiver ID code stored in ID codes storage circuit 320. ID code circuit 320 is similar to ID code circuit 260 discussed with reference to FIG. 8. Microprocessor IC1D preferably provides the logic and control operations for receiver circuit 300 and implements the exemplary software shown in FIGS. 12A–C. Microprocessor IC1D may have a sleep mode and may advantageously be put to "sleep" for periods of time in order to save battery power.

Microprocessor IC1D provides a logic high as a control signal at conductor 336 when the transmitted ID code is the same as the ID code stored in ID code circuit 320. Microprocessor IC1D operates to provide the control signal at conductor 336 for a predetermined amount of time. When the control signal is provided as a logic high at conductor 336, a transistor Q4D in light control circuit 315 is turned ON thereby causing diodes D2/D9 to emit light.

Reset circuit 350 provides a power on reset for microprocessor IC1D in microprocessor circuit 330. 5 volt regulator 340 is coupled to a battery (not shown) through switch SW1D and provides a 5 volt signal at an emitter of a transistor Q1D. The 5 volt signal is provided to regenerative receiver 360, amplifier 380, comparator 390, reset network 350, and microprocessor circuit 330.

Figure 10:
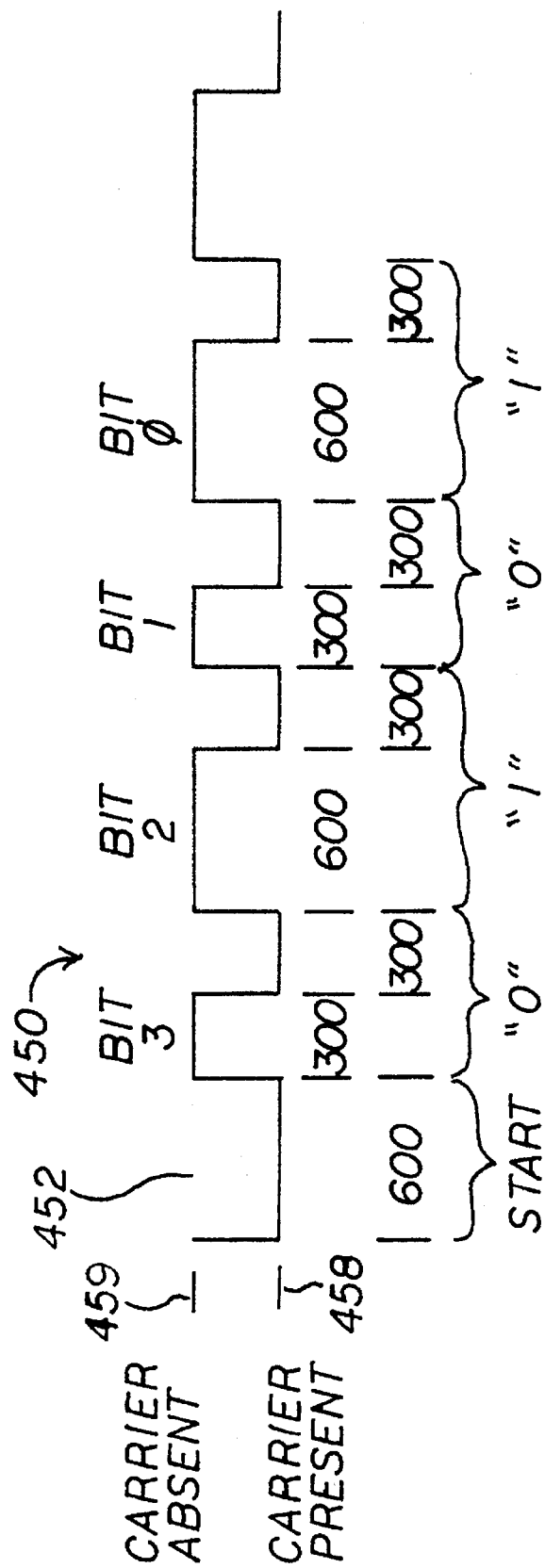
FIG. 10 is a timing diagram of an encoded signal transmitted by the transmitter illustrated in FIG. 8.

With reference to FIG. 10, a data word is sent by transmitter circuit 200 as an encoded signal 450. A logic low 458 is indicated by high amplitude carrier waves or the presence of the carrier wave. A logic high 459 is indicated by low amplitude carrier waves or the absence of the carrier wave. Preferably, all encoded signals 450 begin with a start bit 452 of carrier wave transmission (logic low) for a predetermined time such as 600 microseconds. After the start bit, bits 3-0 are transmitted and are comprised of predetermined periods of logic lows and logic highs.

Bit 3 has a value of logic "0" and is a 300 microsecond period of transmitted logic low transmissions followed by a 300 microsecond period of transmitted logic high. Bit 2 has a value of logic "1" and is a period of 600 microseconds of transmitted logic low followed by a 300 microsecond period of transmitted logic high. Bit 1 has a value of logic "0"; bit 0 has a value of logic "1".

Preferably, a parity bit and checksum bit are also sent to ensure proper transmission and reception of bits 3-0. The above protocol for providing logic "0" and logic "1" advantageously provides superior noise immunity. The start bit being 600 microseconds of transmitted logic high (a signal which is not sent for any logic "1" or logic "0") is advantageous because the start bit is not confused with other bits 3-0.

Figure 11:
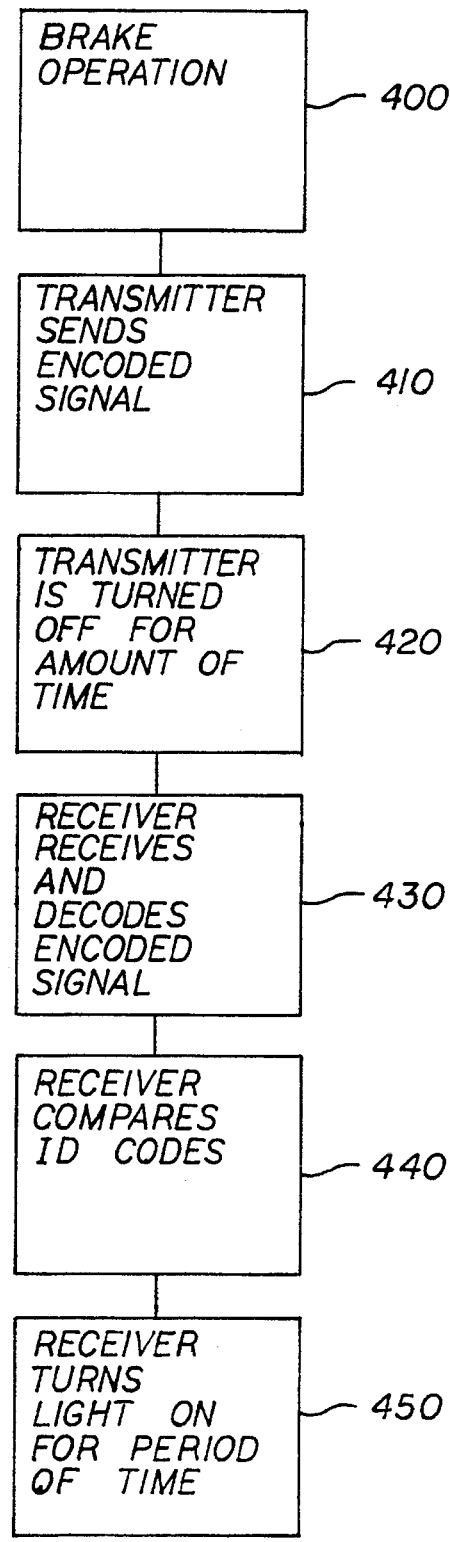
FIG. 11 is a block diagram showing the operation of the transmitter illustrated in FIG. 8 and the receiver illustrated in FIG. 9 in accordance with the second preferred exemplary embodiment.

With reference to FIG. 11, the operation of transmitter circuit 200 and receiver circuit 300 is discussed below. When operator 10 (FIG. 1) initiates a brake operation, power circuit 220 provides a 5 VDC power source at conductor 221 and an 8 VDC power source at conductor 224 (block 400).

After microprocessor circuit 280 is appropriately reset by reset circuit 290, microprocessor IC2 reads the transmitter ID code stored in ID code circuit 260 and generates the appropriate logic signals at conductor 281 representative of the transmitter ID code.

More specifically, microprocessor IC2C causes RF generator 230 to provide a start bit 452 at antenna 23 by providing a logic high at conductor 281 for a period of 600 microseconds. Transistor Q1C is biased ON in response to the logic high at conductor 281 and provides a carrier wave signal at conductor 23.

Next, transmitter circuit 200 provides bits 3-0 to receiver circuit 300. In one particular embodiment, microprocessor IC2C provides a logic low for a period of 300 microseconds at conductor 281 followed by a logic high for a period of 300 microseconds so that antenna 23 provides a logic value "0" for bit 3. Next, microprocessor IC2C provides a logic low for a period of 600 microseconds followed by a logic high for a period of 300 microseconds at conductor 281 so that antenna 23 provides a logic "1" value for bit 2. Microprocessor follows similar steps for providing logic lows and highs at conductor 281 to send the remainder of encoded signal 450 (block 410). Transmitter circuit 200 takes less than 8 milliseconds to transmit encoded signal 450. Alternatively, various other ID codes may be stored and transmitted by transmitter circuit 200. Also, transmitter circuit 200 may use other protocol schemes for sending the ID code.

After encoded signal 450 is transmitted, transmitter circuit 200 does not send another encoded signal for a pseudo-random amount of time (transmitter OFF time). Preferably, the pseudo-random amount of time is based upon the transmitter ID code stored in ID code circuit 260. The transmitter OFF time is preferably between 59 milliseconds and 109 milliseconds. Transmitter circuit 200 preferably includes a counter portion in the software shown in FIGS. 13A–C which counts for the pseudo random time period. Alternatively, a circuit for disabling the transmission of the encoded signal or turning off the entire transmitter circuit 200 for a predetermined amount of time may be utilized. Therefore, transmitter circuit 200 is prevented from sending an encoded signal for a period of time (block 420).

The transmitter circuit OFF time being substantially longer than the time required to transmit the encoded signals advantageously enables several transmitters to transmit their encoded signals simultaneously without interference from the other transmitters. Because the transmitters are OFF for a relatively large amount of time, there is less chance of encoded signals from other transmitters interfering with encoded signal 450. Thus, transmitter circuit 200 is configured to quickly transmit the encoded signal so that each transmitter in a group can advantageously transmit in its own window in which the other transmitters are turned OFF.

After encoded signal 450 is transmitted by transmitter circuit 200, receiver circuit 300 receives the encoded signal at antenna 16. Regenerative receiver 360 inverts the transmitted signal received at antenna 16 due to the operation of amplifier 364 and provides the inverted signal at conductor 362. The inverted signal at conductor 362 is demodulated and provided as the receiver logic signals at conductor 392. Microprocessor IC1D is programmed by the software shown in FIGS. 12A–F to interpret the receiver logic signals in accordance with the protocol discussed with reference to FIG. 10 (block 430).

Microprocessor IC1D compares the transmitter ID code represented by the receiver logic signals to the receiver ID code stored in ID code circuit 320 (block 440). If the ID codes are the same, microprocessor IC1D provides a logic high as a control signal at conductor 336. The logic high is provided on conductor 336 for a predetermined amount of time such as 1.048 seconds so that light 14 (FIG. 2) is turned ON for predetermined amount of time (block 450). Microprocessor IC1D restarts the time period for providing the control signal at conductor 336 in response to receiving another transmitter ID code which is the same as the receiver ID code stored in ID code circuit 320.

Exemplary values for the various circuit components associated with transmitter circuit 200 and receiver circuit 300 are shown in Table 2. The software shown in FIGS. 12A–F and 13A–C is shown in an exemplary fashion only.

It will be understood that while various conductors are depicted in the drawings or figures, they are not so shown in a limiting sense and may comprise plural conductors/connectors as understood in the art. Further, various oscillators, frequencies, and transmitters may be used. The above description is of a preferred exemplary embodiment of the present invention and is not limited to the specific forms shown. For example, while the system was described with reference to radio frequency transmitters and receivers, various other transmitters and receivers could be used without departing from the spirit of the invention. Further, although a light source using LEDs was shown, various devices could be employed to provide indicia of the braking operation.

TABLE I

Values for Components, FIGS. 7 and 8

| | |
|---|---|
| C1 | 1 uf |
| C2 | 5 pf |
| C3 | 33 pf |
| C4 | 0.1 uf |
| C5 | 0.1 uf |
| C6 | 0.1 uf |
| C7 | 0.1 uf |
| C9 | 0.1 uf |
| C13 | 56 pf |
| C20 | 0.1 uf |
| C22 | 47 pf |
| C1B | 120 pf |
| C2B | 5 pf |
| C3B | .1 uf |
| C4B | 47 pf |
| C5B | .1 uf |
| C6B | 10 uf |
| C7B | .1 uf |
| C8B | .1 uf |
| D1 | 1N4001 |
| D2 | HLMP8100 |
| D3 | HLMP8100 |
| D4 | HLMP8100 |
| D5 | HLMP8100 |
| D6 | HLMP8100 |
| D7 | HLMP8100 |
| D8 | HLMP8100 |
| D9 | HLMP8100 |
| D10 | 1N4148 |
| D11 | 5.6 V zener |
| D12 | 1N4148 |
| D1B | 1N4001 |
| C11 | 0.1 uf |
| C8 | 0.1 uf |
| IC1 | MC3371 |
| IC2 | LM393 |
| L1 | TK2502 |
| L2 | 0.68 uH |
| L3 | 0.68 uH |
| L1B | 0.68 uH |
| L2B | 0.68 uH |

TABLE I-continued

Values for Components, FIGS. 7 and 8

| | |
|---|---|
| L3B | 0.68 uH |
| Q1B | 2SC1674L |
| Q1 | 2N3904 |
| Q2 | 2N3904 |
| Q3 | 2N3906 |
| Q4 | 2N3904 |
| Q5 | 2N3904 |
| Q6 | 2N3906 |
| Q2B | 2N3904 |
| Q3B | 2SD1247 |
| R1 | 10K |
| R4 | 1M |
| R5 | 1M |
| R6 | 1M |
| R7 | 1.3M |
| R8 | 200K |
| R9 | 100K |
| R11 | 10K |
| R14 | 100K |
| R16 | 10K |
| R17 | 100K |
| R20 | 1K |
| R1B | 39K |
| R2B | 18K |
| R3B | 100 |
| R4B | 3.3K |
| R5B | 680 |
| R9B | 1K |
| R10B | 5.6 |
| R6B | 47 |
| R7B | 1.8K |
| R8B | 1.5K |
| XT1 | 40.225 MHz |
| XT2 | 455 KHz IF filter |
| XT1B | 40.680 MHz |
| Potentiometer 61 (VR1) | 1M |

All resistance values in ohms.

TABLE II

Values for Components, FIGS. 8 and 9

| | |
|---|---|
| C1C | 470 UF |
| C2C | 10 UF |
| C3C | 3.3 PF |
| C4C | 1.0 PF |
| C5C | 1.8–3 PF |
| C6C | 3.3 PF |
| C7C | 3.3 PF |
| C8C | .01 UF |
| C1D | 22 UF |
| C2D | 33 PF |
| C3D | 0.1 UF |
| C4D | 2 PF |
| C5D | 390 PF |
| C6D | 0.001 UF |
| C7D | 0.001 UF |
| C8D | 3.3 PF |
| C9D | 2 pF |
| C11D | 01 UF |
| C12D | 0.1 UF |
| D1D | 5.6 V zener |
| D1C | 8.2 V zener |
| D2C | 5.1 V zener |
| D3C | 1N4001 |
| D1D | 1N4001 |
| IC2C | LM359 |
| IC1C | MC33064P5 |
| IC2C | PIC16C54 |
| L3D | 10 UH |
| Q1C | PN918 |
| Q1D | 2N3904 |
| Q2D | MPSH10 |
| Q3D | MPSH10 |

TABLE II-continued

Values for Components, FIGS. 8 and 9

| | |
|---|---|
| Q4D | 2N3904 |
| R5C | 1K |
| R1C | 100 |
| R2C | 15K |
| R3C | 10K |
| R4C | 6.8K |
| R6C | 220 |
| R7C | 180 |
| R1D | 3.3M |
| R2D | 100K |
| R3D | 18K |
| R4D | 2M |
| R5D | 10K |
| R6D | 1M |
| R7D | 2.2K |
| R8D | 10K |
| R9D | 51K |
| R10D | 1M |
| R11D | 10K |
| R12D | 22K |
| R13D | 5.1K |
| R14D | 56K |
| R15D | 27K |
| R16D | 10K |
| R17D | 33K |
| R18D | 10K |
| R19D | 2.7K |
| T1D | TK2814 |
| XT1D | 4 MHz |
| XT1C | 4 MHz |

All resistance values in ohms.

What is claimed is:

1. A radio-controlled brake light system, comprising:

a transmitter which provides an encoded signal in response to a brake operation, the transmitter disabling transmission of the encoded signal for a first period of time after the encoded signal is transmitted;

a receiver which provides a control signal in response to the encoded signal; and a light source coupled to the receiver;

wherein the receiver provides the control signal so that the light source emits light for a predetermined amount of time after the encoded signal is received, wherein the predetermined amount of time is greater than the first period of time, whereby said disabling transmission of the encoded signal for the period of time reduces interference to other radio-controlled brake light systems operating in a small area.

2. The system of claim 1 wherein the receiver includes:

a microprocessor; and a regenerative receiver coupled to the microprocessor, the regenerative receiver providing the encoded signal to the microprocessor, wherein the microprocessor provides the control signal to the light source for the predetermined amount of time.

3. The system of claim 1 wherein the encoded system is an AM signal representative of a code.

4. The system of claim 3 wherein the encoded signal includes a start bit, the start bit being a predetermined time period of low amplitude transmission, and a bit code indicative of the ID code, the bit code including a logic high, the logic high being a second predetermined time period of low amplitude transmission followed by a third predetermined time period of high amplitude transmission and, the logic low being a fourth predetermined time period of low amplitude transmission followed by the third predetermined time period of high amplitude transmission.

5. The system of claim 1 wherein the transmitter further includes an RF generator and a microprocessor coupled to the RF generator, the RF generator providing the encoding signals in response to second control signals from the microprocessor, wherein the microprocessor times the first period of time after the encoded signal is transmitted before transmitting another encoded system, the first period of time being a pseudo random period of time related to the encoded signal.

6. The system of claim 1 wherein the period of time is a pseudo random period of time related to the encoded signal.

7. A method of illuminating a remote-controlled brake light in a brake light system including a transmitter and a receiver, comprising the steps of:

transmitting an encoded signal in response to a braking operation, from the transmitter;

preventing the transmitter from transmitting another encoded signal for a first period of time after the encoded signal is transmitted; and receiving the encoded signal from the transmitter; and illuminating light from the brake light in response to the receiver receiving the encoded signal, wherein said illuminating the light is for a second predetermined period of time greater than the first period of time, whereby said preventing the transmitter from transmitting step reduces interference to other remote controlled brake lights.

8. The method of claim 7 wherein the first period of time is a pseudo random period of time related to the encoded signal.

9. The method of claim 7 further comprising the step of comparing the encoded signal to a stored code in the receiver.

10. The method of claim 7 wherein the encoded signal is an amplitude modulated radio frequency signal.

11. The method of claim 7 wherein the first period of time is a pseudo random period of time related to the encoded signal.

12. The method of claim 11 wherein the second period of time is at least six times longer than the first period of time.

13. An apparatus for use with a helmet or other article in a remote controlled brake light system, the system including a transmitter for transmitting an encoded signal in response to a brake operation, the transmitter preventing transmission of the encoded signal for a first period of time after initiation of the braking operation, the encoded signal including a transmitted ID code, the apparatus comprising:

an ID code circuit which stores a receiver ID code;

an antenna;

a receiver circuit coupled to the antenna;

a control circuit coupled to the receiver circuit and the ID circuit;

and a light source coupled to the control circuit;

wherein the receiver circuit receives the encoded signal at the antenna from an external source, the receiver circuit decoding the encoded signal to provide the transmitted ID code to the control circuit, the control circuit comparing the transmitted ID code to the ID receiver code stored in the ID circuit and providing a control signal for a predetermined amount of time when the transmitted ID code equals the ID receiver code stored in the ID code circuit; the light source emitting light in response to the control signal, the predetermined amount of time being greater than the first period of time.

14. The apparatus of claim 13 wherein the control circuit is a microprocessor.

15. The apparatus of claim 13 wherein the encoded signal is an amplitude modulated signal.

16. The apparatus of claim 13 wherein the encoded signal has a carrier frequency of 310 megahertz or 390 megahertz.

17. The apparatus of claim 14 wherein the microprocessor is put in a sleep mode for a particular amount of time in order to reduce power consumption of the apparatus.

18. The apparatus of claim 13 wherein the predetermined amount of time is approximately two seconds.

19. The apparatus of claim 18 wherein the encoded signal includes a 600 microsecond transmission of low amplitude signals.

20. The apparatus of claim 18 wherein the encoded signal is a start bit followed by a four bit signal indicative of the transmitted ID code.

* * * * *

UNITED STATES PATENT AND TRADEMARK OFFICE
CERTIFICATE OF CORRECTION

PATENT NO. : 5,477,209
DATED : 12/19/1995
INVENTOR(S) : Benson, et al.

It is certified that error appears in the above-identified patent and that said Letters Patent is hereby corrected as shown below:

In Claim 7, at Column 12, line 41, please delete "Art" and insert therefor --An--.

In Claim 7, at Column 12, line 54, please delete the second instance of "the" and insert therefor --a--.

In Claim 7, at Column 12, line 60, before "lens" insert --a--.

In Claim 16, at Column 13, line 17, please delete "The" and insert therefor --A--.

In Claim 3, at Column 17, line 56, delete "system" and insert therefor --signal--.

In Claim 4, at Column 17, line 64, delete "the" and insert therefor --a--.

In Claim 5, at Column 18, line 3, delete "encoding signals" and insert therefor --encoded signal--.

In Claim 5, at Column 18, line 7, delete "system" and insert therefor --signal--.

In Claim 13, at Column 18, line 6, please delete "receiver ID" and insert therefor --ID receiver--.

In Claim 13, at Column 18, line 49, delete "remote-controlled" and insert therefor --remote controlled--.

In Claim 7, at Column 18, line 19, delete "and".

UNITED STATES PATENT AND TRADEMARK OFFICE
CERTIFICATE OF CORRECTION

PATENT NO. : 5,477,209
DATED : 12/19/1995
INVENTOR(S) : Benson, et al.

It is certified that error appears in the above-identified patent and that said Letters Patent is hereby corrected as shown below:

In Claim 13, at Column 18, line 52, before "circuit" insert --code--.

In Claim 13, at Column 18, line 58, delete the second instance of "the" and insert therefor --an--.

In Claim 13, at Column 18, line 59, after "ID" insert --code--.

In Claim 13, at Column 18, line 62, please delete ";" and insert therefor --,--.

Signed and Sealed this

Twenty-seventh Day of February, 2001

Attest:

NICHOLAS P. GODICI

Attesting Officer

Acting Director of the United States Patent and Trademark Office